United States Patent [19]

Werner

[11] 3,844,777

[45] Oct. 29, 1974

[54] FILLER ALLOYS FOR FLUXLESS BRAZING ALUMINUM AND ALUMINUM ALLOYS

[75] Inventor: William J. Werner, Clinton, Tenn.

[73] Assignee: The United States of America as represented by the United States Atomic Energy Commission

[22] Filed: Oct. 4, 1972

[21] Appl. No.: 295,080

[52] U.S. Cl. ................................................ 75/138
[51] Int. Cl. .......................................... C22c 21/00
[58] Field of Search ............ 75/138, 134 G; 148/32, 148/32.5

[56] References Cited
UNITED STATES PATENTS

| | | | |
|---|---|---|---|
| 2,659,138 | 11/1953 | Stroup | 75/134 G |
| 3,395,001 | 7/1968 | Stroup et al. | 75/138 |

*Primary Examiner*—R. Dean
*Attorney, Agent, or Firm*—John A. Horan; David S. Zachry; Irving Barrack

[57] ABSTRACT

This invention relates to a fluxless brazing alloy for use in forming brazed composites made from members of aluminum and its alloys, said brazing alloy consisting of 1–10 percent Y, 15–30 percent Ge and the balance Al; 1–10 percent Y, 17–30 percent In and the balance Al; 58–70 percent Ag, 10–12 percent In and the balance Al; 35–40 percent Ag, 38–47 percent Ge, 13–16 percent Al.

1 Claim, No Drawings

FILLER ALLOYS FOR FLUXLESS BRAZING ALUMINUM AND ALUMINUM ALLOYS

The invention described herein was made in the course of, or under, a contract with the U.S. Atomic Energy Commission.

SUMMARY OF THE INVENTION

The present invention relates to the fluxless brazing of aluminum and its alloys. The invention may be regarded in three aspects: (1) a class of brazing filler alloys which melt and flow over a narrow range of temperature to form a sound metallurgical joint between aluminum and/or aluminum alloy parts; (2) the process for forming brazed composites with the subject brazing alloys; and (3) the resultant brazed composite.

Any alloy designated as a brazing filler alloy must satisfy at least two basic criteria: wettability and flowability. By wettability is meant the ability of the molten brazing filler alloy to wet and conform to the base metal surface and, as a result, when cooled below its solidus temperature, to form a strong bond to that metal. Flowability is the property of the brazing alloy that determines the distance it will travel in the molten state away from its original position due to the action of capillary forces. To flow well, an alloy should not suffer any appreciable increase in its liquidus temperature even though its composition may be altered by dissolution of the base metal. This is extremely important in aluminum brazing since the brazing operation is generally performed very near the liquidus temperature.

Wettability and flowability are functions of both the brazing filler alloy and the metal or alloy to be joined. In the case of aluminum and its alloys, the characteristic tenacious oxide which forms on the surface has long been recognized as a detriment to brazing operations. For the most part, the prior art requires chemical cleaning of the parts to be joined to remove thick oxide films and the use of a separate corrosive flux during braze bonding. Use of the flux effects removal of the oxide, allowing the molten brazing alloy to come in contact with an oxide-free surface to form the required joint. However, while the use of a flux is an aid to wetting and flowing, its subsequent complete removal is difficult and in many cases impossible. Any flux trapped in the final joint can be detrimental from both a strength and corrosion standpoint.

The present invention is predicated on the discovery of a class of brazing alloys which has the capacity to form a brazed bond between aluminum and aluminum alloy parts without the necessity of using a corrosive flux. The fluxless brazing filler alloys falling within the scope of this invention are further characterized in that they are selected from the group consisting of, in weight percent: 1–10 Y, 15–30 Ge and the balance Al; 1–10 Y, 17–30 In and the balance Al; 58–70 Ag, 10–12 In and the balance Al; and 35–40 Ag, 39–47 Ge, 13–16 Al.

The brazing filler alloys within the scope of this invention have the capacity to form sound brazed composites of aluminum and aluminum alloy parts when utilized in accordance with the procedure to be described. The brazing filler alloys are formulated by Tungsten Inert Gas (TIG) melting techniques to form alloy buttons which are subsequently cut into appropriate sized pieces and preplaced near the faying surfaces.

In the ensuring description I shall describe braze bonding of the aluminum alloys in the Table.

TABLE

| | Alloy Designation | |
|---|---|---|
| | 6061 | 2219* |
| | Composition (wt. %) | |
| Si | .40–.8 | .20 |
| Fe | .7 | .30 |
| Cu | .15–.40 | 5.8–6.8 |
| Mn | .15 | .20–.40 |
| Mg | .8–1.2 | .02 |
| Cr | .04–.35 | — |
| Zn | .25 | .10 |
| Ti | .15 | .02–.10 |
| Al | Balance | Balance |
| Melting Range (°C.) | 580–650 | 540–645 |

*Vanadium, 0.05–0.15; zirconium, 0.10–0.25.

There are several factors which are of prime importance to fluxless brazing with the brazing filler alloys of this invention. The first is cleanliness of the surfaces to be joined. The surface of any aluminum or aluminum alloy part forms a tenacious oxide film even at room temperature. While oxidation of aluminum or aluminum alloys takes place even in vacuum or inert atmospheres, a practical successful fluxless brazing operation can be performed, provided that the faying surfaces, i.e., the surfaces to be joined, are pretreated by a chemical cleaning action which provides a "workably thin" oxide film. By a workably thin oxide film is meant a surface oxide film which is sufficiently thin to be penetrated by the fluxless filler alloys of this invention, thereby allowing the desired wetting and flowing action needed to produce a brazed joint. I find that in order to produce a workably thin oxide film it is necessary to subject the surfaces to be joined to a chemical cleaning action, the exact nature of which depends on the alloy composition of the parts to be joined as well as the brazing alloy. For example, the 6061 and 2219 alloys can be satisfactorily cleaned to produce a workable surface by immersion into a 20 volume percent nitric acid — 2 volume percent HF — water solution at room temperature for a period ranging from 1 to 3 minutes. The cleaning step is followed immediately by a cold water rinse which in turn is followed by a flush with acetone. The chemically cleaned parts maintain their workable surfaces for a limited time so that brazing should occur fairly soon, no more than about 1 hour, after cleaning. Effective brazing with the alloys of this invention is brest carried out in vacuum at a pressure less than about $1 \times 10^{-5}$ Torr at the brazing temperature. After the brazing alloy has melted and flowed along the faying surfaces, the brazed part may be cooled in an inert atmosphere such as helium and argon to complete the brazing cycle. Care should be exercised in the time-temperature cycle used to heat the work up to the brazing temperature since the workable surface produced by the chemical pre-cleaning operation may be destroyed by an overly long preheating cycle. The optimum heating cycle is a matter of routine procedure and, once established for a particular alloy system, will present no difficulty.

Brazing filler metal wettability and flowability determinations were performed using base metal pads of the alloys shown in the Table. Both the pads and the experimental brazing filler metals were cleaned prior to undergoing a thermal cycle for determination of melting temperature and wettability.

The Al-Ge-Y System

Useful filler alloys for vacuum brazing of aluminum composites are formulated by adding suitable amounts of yttrium to reference aluminum - germanium binary alloys. In the resulting ternary system, yttrium appears to serve as an efficient oxide-former and thus facilitates wetting and promotes flow of the filler braze alloy.

The positive advantage of adding yttrium to the Al-Ge system is counterbalanced by the fact that it results in a marked increase in melting point from the melting point of the reference Al-Ge eutectic of 424°C. For the purposes of this invention useful filler braze alloys are produced from an alloy consisting essentially of 1–10 Y, 15–30 Ge and the balance Al. In this range of composition one may select a ternary alloy having a melting point in the range slightly above 424°C. up to 615°C. depending on the amount of yttrium. Thus, a 60 Al – 10 Y – 30 Ge alloy melts at 615°C. Lower amounts of Y and Ge may be expected to produce lower melting filler alloys. When heated to their melting point such alloys will wet and flow freely on aluminum base alloys and produce a sound brazed composite.

The Al-In-Y System

Useful filler alloys for vacuum brazing aluminum or aluminum alloy parts are formulated by adding up to 10 weight percent yttrium to a reference Al-In eutectic composition. As in the Al-Ge system, yttrium appears to serve as an effective oxygen sink thus serving to promote wetting and flowing of the molten filler alloy. However, in this case, the yttrium actually appears to result in a ternary alloy with lowered melting point relative to a reference 83 Al – 17 In eutectic composition with a melting point of 637 ±3°C. By increasing additions of indium and yttrium at the expense of aluminum, a ternary filler braze alloy is produced which may be expected to melt at a temperature in the range 600°–640°C. For the purposes of this invention filler braze alloys consisting essentially of 17–30 weight percent indium, 1–10 weight percent Y, and the balance aluminum may be expected to wet and flow easily at the melting temperature of the filler alloy. Thus, a sound joint was formed from 6061 base alloy parts using a 10 Y – 30 In – 60 Al filler base alloy which melted at about 610°C.

The Ag-Al-In System

Useful ternary - quaternary filler braze alloys may be formulated by modifying a reference 70 Ag – 30 Al binary eutectic composition which melts at 566°C. By maintaining a constant Ag/Al weight ratio of 2.3 to 2.5 at concentrations in the range 58–70 weight percent Ag and 20–26 weight percent Al, ternary additions of from 10–12 weight percent indium produce a filler braze alloy which wets and flows freely on aluminum or aluminum alloy surfaces at a temperature in the range 580°–600°C.

Quaternary additions of up to 5 weight percent Y in place of a portion of Ag and Al can be used where oxide films present an inordinate problem. Thus, where a ternary filler alloy consisting essentially of 62 Ag, 26 Al and 13 In melted at 580°C., a quaternary alloy consisting essentially of 58 Ag, 24 Al, 13 In and 5 Y melted at 600°C.

The Ag-Ge-Al System

An extremely useful low-melting filler braze alloy can be formulated along a line of constant Ag/Al weight ratio of 2.3 to 2.5 at concentrations in the range 35–40 Ag, 13–16 Al and 39–47 Ge. All members of this class can be expected to function as braze filler alloys at a melting point in the range 500°–550°C. Thus, an alloy consisting essentially of 38 Ag, 16 Al and 46 Ge was found to melt at 500°C. and produce sound brazed joints with even filleting.

Quaternary additions of up to 5 weight percent Y in place of a portion of Ag and Ge provide an enhanced measure of oxide dissolution but at the expense of increased melting point. Thus, a quaternary alloy consisting essentially of 36 Ag, 15 Al, 44 Ge and 5 Y melts at 540°C. with somewhat better flow properties than the ternary Ag – Al – Ge alloys. Greater amounts of yttrium raise the melting point to higher levels and promote an embrittling phase.

All concentrations of alloy ingredients in this specification are stated in weight percent.

What is claimed is:

1. A fluxless brazing alloy for vacuum brazing aluminum or aluminum alloy parts consisting essentially of 1–10 percent yttrium, 15–30 percent germanium and the balance aluminum, said alloy having a melting point in the range above 424°C. and up to 615°C.

* * * * *